Nov. 5, 1968

D. W. SOBEK ET AL 3,409,044

FOAM GUN HEAD

Filed Jan. 12, 1965

INVENTORS
DALE W. SOBEK
BY A. C. BOLTINGHOUSE

Elliott & Pastoriza
ATTORNEYS

INVENTORS
DALE W. SOBEK
BY A. C. BOLTINGHOUSE

Elliott & Pastoriza
ATTORNEYS

Nov. 5, 1968

D. W. SOBEK ET AL 3,409,044

FOAM GUN HEAD

Filed Jan. 12, 1965

INVENTORS
DALE W. SOBEK
BY A. C. BOLTINGHOUSE

Elliott & Pastoriza
ATTORNEYS

United States Patent Office 3,409,044
Patented Nov. 5, 1968

3,409,044
FOAM GUN HEAD
Dale W. Sobek, Oakland, and Angus C. Boltinghouse, Northridge, Calif., assignors, by mesne assignments, to Olin Mathieson Chemical Corporation, a corporation of Virginia
Filed Jan. 12, 1965, Ser. No. 424,999
5 Claims. (Cl. 137—607)

ABSTRACT OF THE DISCLOSURE

The apparatus is a foam gun head having a central static mixing chamber with a central outlet passage. The gun head body includes first and second side bores preferably extending towards the central chamber from opposite sides of the body and arranged to receive suitable valve means. First and second inlet passages intersect these side bores from lateral directions, the side bores themselves including reduced diameter portions defining valve seats which communicate with the central chamber. First and second valve means are receivable within the side bores and include valve actuators secured to suitable valve stems. The valve stems, in turn, include valve head structures arranged to seat on the valve seats to control communication between the inlet passages and the central chamber. Suitable biasing springs normally hold the valve head structure against the seats. When the actuators are rotated by a trigger means, the valve stems are pulled away from the valve seats to provide communication between the inlet passages and the central chamber.

---

This invention relates generally to foam guns and more particularly to an improved foam gun head incorporating a static mixing chamber for generating polyurethane foam.

In co-pending patent application Serial No. 264,419 filed March 12, 1963, and entitled Portable Foaming Appartus, there are disclsed first and second sources of foam ingredients or components together with a foam "gun" having a static chamber for receiving and mixing the ingredients to provide a polyurethane foam. As set forth in this application, the basic concept resides in the introduction of only two components into the static chamber. Prior to introduction into the chamber, these components are provided with a very low boiling point gas, such as Freon 12. When the pressure holding the gas in a liquid condition in each of the ingredients is relieved in the gun mixing chamber, the ingredients change form and exhibit a "froth" characteristic. It is thus the blending of the two resulting froths formed from each of the ingredients that takes place in the static mixing chamber. Since the froth has a surface area approximately twenty times greater than the available surface area for chemical reactivity when the ingredients are mixed without the benefit of the low boiling point gas, a greatly improved reaction and blending of the normally non-miscible liquid ingredients results.

The present invention relates to specific improvements in a foam gun head particularly suitable for use in the system described in the above referred to copending application for generating polyurethane foam.

In the provision of a foam gun head for enabling pre-expansion of the foam ingredients in the mixing chamber to take place properly, there are three important considerations. First, the inlet valves for passing the respective foam ingredients to the central mixing chamber must work with a high degree of reliability and in a smooth and carefully controllable manner; secondly, it is extremely important that a highly reliable seal between the inlet passage and the central mixing chamber be effected upon closing of the valve; and, third, the valve assemblies themselves should be so designed as to enable easy assembly and disassembly for cleaning or other purposes.

With the foregoing considerations in mind, it is accordingly a primary object of this invention to provide an improved foam gun head incorporating the foregoing desirable features, to the end that polyurethane foam may be generated with greater reliability than has been possible heretofore.

More particularly, it is an object to provide an improved foam gun head which incorporates unique trigger and valve means for enabling very careful control of opening and closing of the respective inlet valves for passing foam ingredients to the central mixing chamber in the gun.

Another important object is to provide novel sealing means in the valve structure for insuring a perfect seal when the valves are in closed condition to isolate the ingredients from each other when the gun is cut off.

Still another important object is to provide a unique mechanical assembly for the valve means providing proper sealing in other areas of the valve and also enabling the valve assembly to be readily assembled and disassembled for easy cleaning.

Briefly, these and many other objects and advantages of this invention are attained by providing a foam gun head having a central static mixing chamber with a central outlet passage. The gun head body includes first and second side bores preferably extending towards the central chamber from opposite sides of the body and arranged to receive suitable valve means. First and second inlet passages in turn intersect these side bores from lateral directions, the side bores themselves including reduced diameter portions defining valve seats which communicate with the central chamber. First and second valve means are receivable within the side bores and include valve actuators secured to suitable valve stems. The valve stems, in turn, include valve head structures arranged to seat on the valve seats to close off communication between the inlet passages and the central chamber. Suitable biasing springs normally hold the valve head structures against the seats. When the actuators are rotated by a trigger means, the valve stems are pulled away from the valve seats to provide communication between the inlet passages and the central chamber.

To provide the desired reliable and smooth action of valve stem movement, the actuators themselves are provided with cam follower surfaces arranged to cooperate with cam surfaces formed on a valve body surrounding the stem and secured in a stationary position relative to the side bores. Only slight arcuate rotations of the actuators are then necessary to back the same away from the side openings as a consequence of the inter-action of the cam surfaces to thereby open the valve.

In accord with another important feature as described heretofore, the valve head structures on the valve stems include novel means for effecting a proper seal. In a first embodiment of the invention, this means constitutes an O-ring which is cradled by an annular channel structure formed in part by an end portion of the valve stem and a valve head surrounding the valve stem. In a second embodiment, the valve stem is provided with a flange and backup spaced valve head defining an annular channel for keying a particularly shaped ring-type sealing member.

Still another feature of the invention resides in a coupling structure between the valve body through which the valve stem passes and the interior of the side bore. This coupling is in the form of projections on the exterior of the valve body and interior of the side bore adapted to be interlocked with each other and yet easily disassembled to facilitate cleaning of the valve assembly.

A better understanding of the improved foam gun head of this invention will be had by now referring to preferred embodiments thereof as illustrated in the accompanying drawings, in which.

Figure 1:
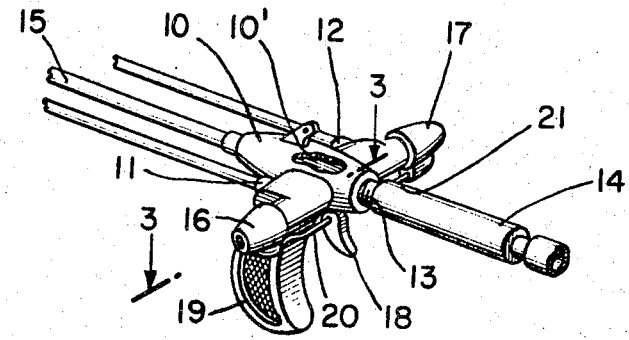
FIGURE 1 is a perspective view, partly broken away, of the improved foam gun head of this invention.

Referring first to FIGURE 1, there is illustrated a foam gun head including a gun body 10 provided with first and second inlet passages 11 and 12, and a central outwardly extending passage 13. The outlet passage 13 communicates with a central chamber 10' in the body 10. A nozzle means 14 connects to the outlet 13 and may be of the type shown and described in co-pending patent application Serial No. 365,322, filed May 6, 1964, and entitled Foam Mixing Head. The gun head assembly also includes an inlet flushing line 15 passing into the rear center portion of the body 10 as shown.

The inlet passages 11 and 12 are arranged to be placed into communication with the central chamber 10' in the body 10 by unique first and second valve means respectively including valve actuators 16 and 17. These valve actuators are operated by a trigger 18 and associated pistol grip structure 19 through connecting links 20 and 21, respectively. The arrangement is such that the gun may be held in one hand and the valve actuators 16 and 17 operated simultaneously by the trigger 18.

In using the gun described in FIGURE 1, foam ingredients are introduced through the first and second inlet passages 11 and 12. For example, a toluene di-isocyanate component may be introduced into the inlet 11, and a suitable resin component introduced into the inlet 12. As described heretofore, these respective components are under pressure and premixed with a low boiling point gas in liquid form such as Freon 12.

When the trigger 18 is pulled, the valve actuators 16 and 17 simultaneously open the valves to permit the ingredients to effect a pre-expansion and form a froth within the central mixing chamber 10' of the gun body 10. Further mixing of the froths takes place in the nozzle means 14 so that a pre-expanded polyurethane foam issues from the end theerof. Details of this particular portion of the operation of the gun nozzle are set forth in the above-referred-to co-pending patent application Serial No. 365,322.

As discussed heretofore, it is important that the valve means be capable of highly reliable operation and smooth controllable action, insure proper seals when in closed position, and be relatively easy to assemble and disassemble for cleaning purposes. The valve portions operated by the valve actuators 16 and 17 illustrated in FIGURE 1 which meet these specifications are identical in construction and therefore a detailed description of one of the valves will suffice for both.

Figure 2:
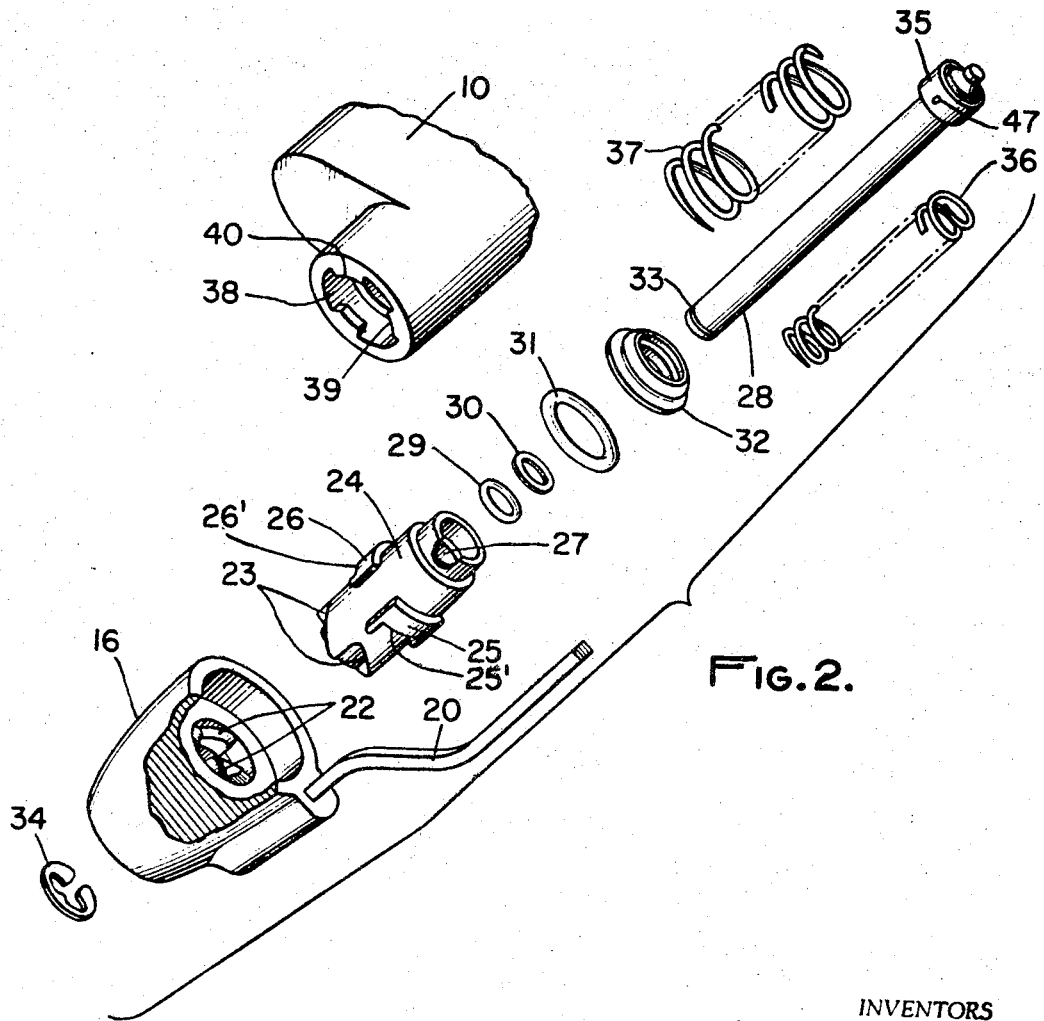
FIGURE 2 is an enlarged exploded fragmentary view of one of the inlet valve means and associated structure incorporated in the gun of FIGURE 1.

With the foregoing in mind, reference is now had to FIGURE 2 which illustrates in exploded view the various elements making up the valve assembly and valve actuator 16 for opening up and closing off communication between the inlet passage 11 and the central chamber 10' in the body 10.

Referring first to the lower left portion of FIGURE 2, the valve actuator 16 includes a recessed interior portion having circumferentially disposed cam follower surfaces 22. These cam follower surfaces 22 in turn are arranged to cooperate with cam surfaces 23 formed on one end of a valve body 24. The valve body 24 is provided with projections such as at 25 and 26 on its exterior, the purpose for which will become clear as the description proceeds. The valve body also includes a central bore 27 arranged to receive an an elongated valve stem 28 shown in the upper right hand portion of FIGURE 2. To provide a proper sealing relationship between the valve body 24 and the elongated stem there is provided an inner O-ring 29 and backing washer 30. An outer seal between the valve body 24 and a portion of a side bore opening in the gun body 10 to be described subsequently, is, in turn, effected by an outer O-ring 31 and backing plate 32.

One end of the valve stem 28 includes an annular groove 33 adapted to receive a snapped ring 34 after the stem 28 has been passed through the central bore 27 in the valve body 24 and interior of the actuator 16. the snap ring secures the stem 28 to the valve actuator 16 for longitudinal movement with the actuator.

The other end of the valve stem 28 terminates in an enlarged valve head structure including a valve head 35. A valve head biasing spring 36, shown separated from the valve stem 28, normally surrounds the stem 28 to bias the valve head against a valve seat as will also become clear as the discription proceeds. There is also provided a second biasing spring 37 which, when in assembled condition, is coaxial with the valve stem 28 and spring 36 and bears against the plate 32 to aid in keying the valve body within a side bore opening 38 in the gun body 10 shown in fragmentary position above the exploded parts in FIGURE 2.

As shown, the side bore opening 38 includes inwardly extending projections such as indicated at 39 and 40 arranged to cooperate with the projections 25 and 26 on the valve body 24 when the same is received within the side bore 38.

The elements described in FIGURE 2 are assembled by telescoping the various parts together and placing the springs 36 and 37 in coaxial relationship with respect to the valve stem 28. The snap ring 34 is secured within the groove 33 on the one end of the stem 28 protruding from the far end of the actuator 16. With these elements so assembled, the valve body 24 may then be received within the side bore 38 of the gun body 10 by rotating the structure so that the projections 25 and 26 will pass between the projections 39 and 40. A partial rotation will then dispose the projections in alignment with the projections 39 and 40 so that the valve body 24 is keyed within the side bore opening. In this respect, it will be noted that there are provided recessed areas 25' and 26' in the rear parts of the projections 25 and 26, these recessed areas being arranged to receive the projections 39 and 40 so that the valve body 24 is keyed against rotational movement as well as longitudinal movement relative to the gun body portion 10. The second biasing spring 37 in cooperation with the backing plate 32 biases the projections 25 and 26 against the projections 39 and 40 after the various element are assembled. The assembled valve is shown in FIGURE 3 wherein the various parts are designated by the same numerals employed in FIGURE 2.

Figure 3:
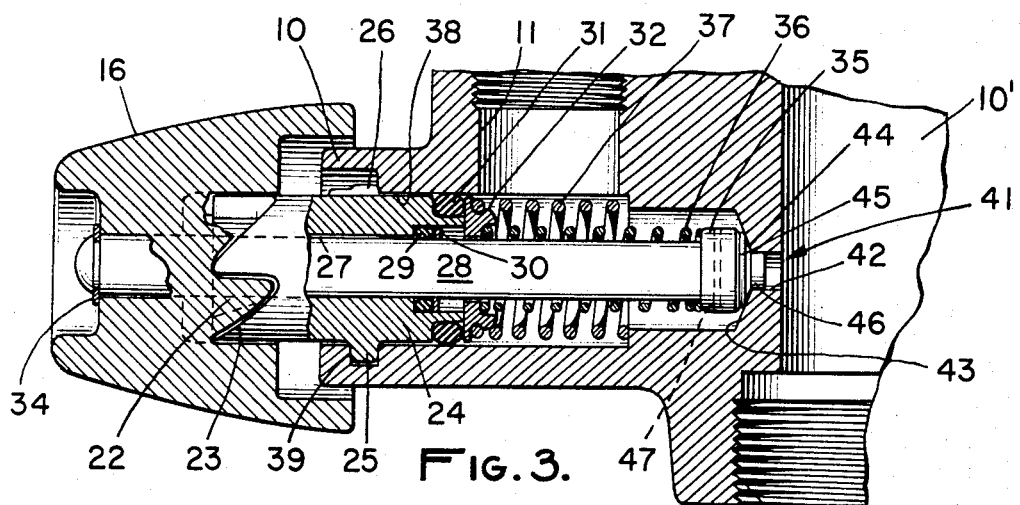
FIGURE 3 is an assembled view partially in cross-section of the valve structure elements illustrated in FIGURE 2, showing the valve in closed position.

In FIGURE 3 it will be noted that the cam follower surfaces 22 of the actuator 16 are in engagement with the cam surfaces 23 on one end of the valve body 24. The exterior projections 25 and 26 of the valve body 24 in turn are keyed into the side bore 38 of the body 10 as a consequence of the recessed areas in these projections receiving the inwardly directed projections such as the projection 39. It is important to understand accordingly that the valve body 24 is held both rotationally and longitudinally stationary with respect to the side bore 38 and gun body 10. On the other hand, by urging the valve body 24 inwardly slightly against the bias of the spring 37, the projections 25 may be "unhooked" from the projections 39 and upon a slight rotation of the valve body 24, it may be readily removed from within the side bore 38 thereby facilitating greatly the assembly and disassembly of the structure.

It will also be clear from FIGURE 3 that the biasing spring 36 bearing against the backing plate 32 and the enlarged valve head 35 serves to bias the valve stem 28 and valve head structure to the right as viewed in FIGURE 3. The movement of the valve stem 28 to the right within the central bore 27 of the valve body 24 is limited because of the snap ring 34 at the one end of the valve stem 28 securing this end of the valve stem to the actuator 16. It should be understood accordingly that the valve stem 28 and actuator 16 move longitudinally together relative to the valve body 24 and side bore 38.

Referring now particularly to the right hand portion of FIGURE 3, there is illustrated an entrance inlet 41 to central chamber 10' in the gun body 10. The chamber 10' is placed in communication with the side bore opening 38 through the entrance opening in the form of the reduced diameter passage 42 defining a valve seating surface 43. The inlet passage 11 in turn extends laterally into the gun body to intersect the side bore 38 as shown in a position between the valve body 24 and valve seat so that unseating of the valve stem head 35 will place the inlet passage 11 in communication with the opening 42 and chamber 10'.

The valve head structure itself includes a valve head seating surface 44 and cooperating O-ring 45 for engaging the valve seat 43. The structure also includes a projection end portion 46 which is received partially within the reduced diameter portion 42 when the valve is in closed position as illustrated in FIGURE 3.

Figure 4:
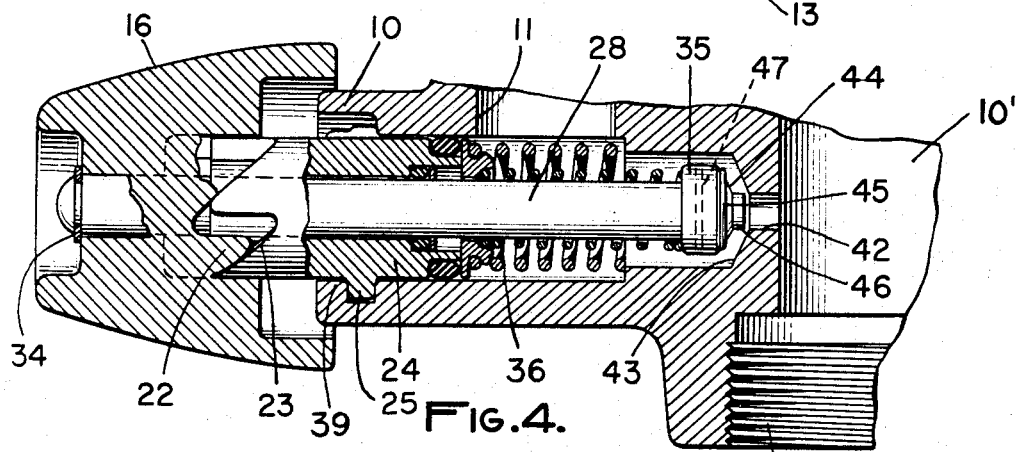
FIGURE 4 is a view similar to FIGURE 3 illustrating the valve in open position.

Referring now to FIGURE 4, the relative positions of the valve stem 28, valve head 35, actuator 16, and cam follower surfaces 22 relative to the valve body 24 when the valve is opened are illustrated.

The opening of the valve is effected by rotation of the valve actuator 16 about the axis of the valve by means of the trigger structure described in conjunction with FIGURE 1. Thus, it will be clear that rotation of the actuator 16 through a small arc will result in the cam follower surfaces 22 being cammed by the cam surfaces 23 on the valve body 24 in a direction to urge the actuator 16 and thus the valve stem connected thereto to the left as viewed in FIGURE 4. The interaction of the cam surfaces takes place since the valve body 24 is held against both rotational and longitudinal movement by the keying projections 25 and 39 described in conjunction with FIGURE 3. Communication is thus provided between the inlet passage 11, past the valve head 35 and through the reduced diameter bore 42 into the central chamber 10'.

The stem must be held in its open position by retaining the actuator 16 in its rotated position since the biasing spring 36, in exerting a force on the valve stem head 35, tends to move the valve stem 28 and actuator 16 to the right as viewed in FIGURE 4. However, because of the cam surfaces described, a very smooth and carefully controllable action is realizable in lifting the valve head structure from the valve seat 43.

When the trigger mechanism is released, the actuator 16 is free to rotate in an opposite direction, this rotation occurring as a consequence of the biasing spring 36 urging the stem 28 in a right hand direction to seat the valve head structure 35. Thus, the reverse rotation of the actuator 16 is a consequence of the cam follower surfaces 22 riding along the cam surfaces 23 when the structure is moved to the right as viewed in FIGURE 4. The O-rings 29 and 31 provide proper sealing at the rear end portions of the side bore opening so that the foam ingredient cannot escape from this portion of the valve structure.

Figures 5, 6:
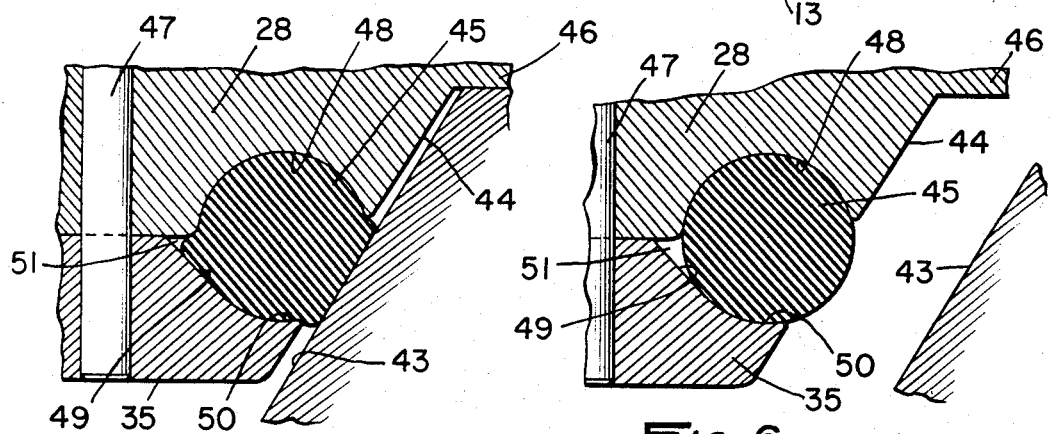
FIGURE 5 is a greatly enlarged cross-sectional view of a portion of the valve stem head structure in closed position as illustrated in FIGURE 3.
FIGURE 6 is a view similar to FIGURE 5 illustrating the valve head structure in open position.

Referring now to FIGURES 5 and 6, further details of the valve head structure are shown. As stated heretofore, it is extremely important that a consistent and highly reliable seal be effected by the valve head structure with respect to the valve seat surface 43. Towards this end, and in a first embodiment of this portion of the invention, the end of the valve stem 28 extends past the valve head 35 which is secured to the end of the valve stem by the transverse pin 47. The extending end of the stem includes an annular channel of partially circular cross-section as indicated at 48 in FIGURE 5. The forward end of the valve head 35 includes an inward beveled surface 49 which curves forwardly slightly as at 50 where it opens out in a plane co-planar with the valve head surface 44. The arrangement is such that a cradling of the O-ring 45 is effected, this cradling encompassing more than half the circumferential cross-section of the O-ring.

In addition, the beveled portion 49 extends slightly to the rear of the arcuate cutout channel 48 to define a small clearance 51. This clearance is important in that it provides room for the O-ring 45 to expand into when the valve head is seated, this expansion occurring as a consequence of the reaction pressure of the valve seat surface 43 against the O-ring 45. Without this clearance, the O-ring would deteriorate much more quickly than would otherwise be the case.

In FIGURE 6, the O-ring is shown in its natural shape after the valve head 35 has been retracted from the valve seat 43. It will be noted that the former portion of the O-ring within the clearance space 51 is now free of the clearance space so that the O-ring can assume its natural position when the valve is open. It is found with the foregoing sealing construction for the valve head and end of the stem, that a far more reliable seal than has been possible heretofore results.

Figure 7:
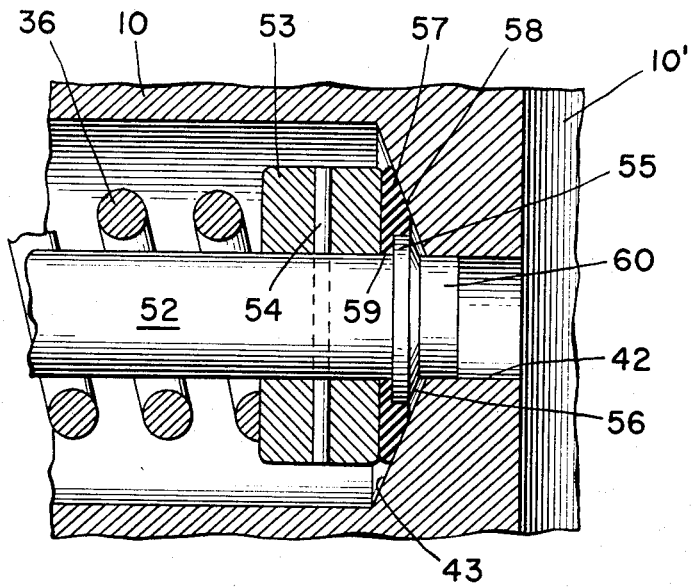
FIGURE 7 is a fragmentary view partly in cross-section of a modified type of valve head structure in closed position; and, FIGURE 8 is a view similar to FIGURE 7 showing the modified structure in open position.
Figure 8:
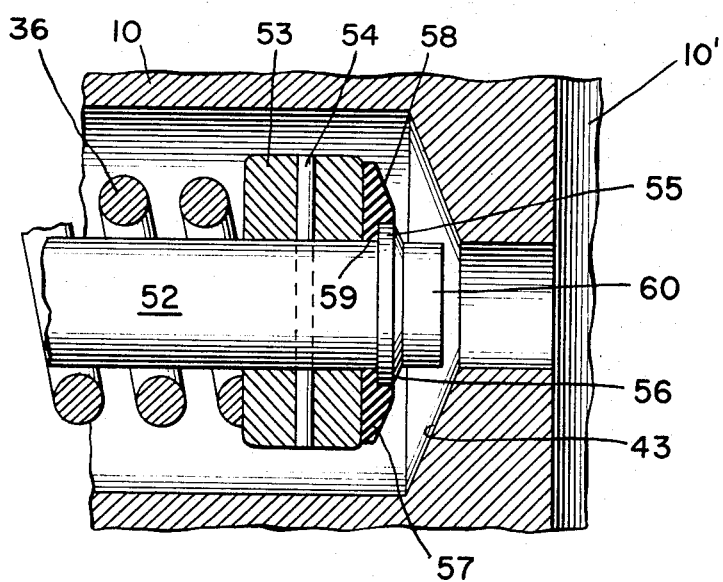

Referring now to FIGURES 7 and 8, there is shown a modified valve head and stem structure which may be used in lieu of the stem 28 and valve head structure 35 shown in FIGURES 1–6. The other environmental elements are the same and are therefore designated by the same numerals.

With specific reference to FIGURE 7, the valve stem 52 includes a valve head 53 pinned to the end portion of the stem by a pin 54 in a manner similar to the securement of the valve head 35 by the pin 47 described in FIGURES 3–6. The protruding end portion of the valve stem 52 however includes an annular flange 55 which is in spaced relationship with respect to the valve head 53. The flange 55 includes a front smooth beveled surface 56 at an angle corresponding to the slope of the valve seat 43.

Actual sealing by this valve head structure is achieved by a resilient ring-like member 57 having a beveled front annular surface 58 of considerable area adapted to engage in flat relationship the corresponding area of the valve seat 43. The resilient ring member 57 is keyed into the head structure by being received within an annular channel 59, defined between the flange 55 and front face of the valve 53.

The geometry of the structure is such that when the resilient ring member 57 engages the valve seat 43, there is room for some expansion of the resilient ring in a radially outward direction along the outer front peripheral surface of the valve head 53. When the valve stem 52 and valve head structure are retracted from the valve seat 43, the resilient ring member 57 will appear as indicated in FIGURE 8.

An advantage of the structure illustrated at FIGURES 7 and 8 is the large seating area afforded by the sealing ring member 57.

From the foregoing description, it will be clear that the present invention has thus provided a greatly improved foam gun head. Not only is reliable, controlled, and smooth valve operation effected, as a consequence of the cam arrangement described, but in addition, the valve body structure together with the side bore projections for enabling quick locking and releasing of the valve body in the side bore enable very easy assembly and disassembly of the valve and its various parts with the gun. Finally, the novel mechanical design of the sealing structure incorporated in the valve head as described in conjunction with FIGURES 5-8 insures an extremely reliable seal which, upon constant operation between opened and closed portions, will last for a longer time than is possible with conventional valve head designs.

While certain embodiments of the foam gun head have been described in considerable detail for illustrative purposes, it should be understood that minor modifications may be made that fall clearly within the scope and spirit of this invention. The improved foam gun head therefore is not to be thought of as limited to the exact structure set forth for illustrative purposes.

What is claimed is:

1. A foam gun head comprising, in combination: a gun body having a central chamber; a central outlet passage extending from said chamber, said body having opposite side bores including reduced diameter portions defining valve seats in communication with respective opposite sides of said central chamber; first and second inlet passages passing laterally into said gun body to intersect said side bores adjacent to said valve seats respectively; and first and second valve means received in said bores for enabling opening and closing of said valve seats, each of said valve means including: a valve body disposed in the side bore and having a central bore; an elongated valve stem longitudinally slidable in said central bore; a valve actuator connected to the far end of said valve stem extending from said central bore, the other end of said stem terminating in a valve head structure adapted to seat on the valve seat; means biasing said valve head structure against said valve seat; and cooperating cam surfaces on said valve body and valve actuator such that rotation of said valve actutor relative to said valve body moves said valve actuator longitudinally away from said side bore to in turn move said valve stem away from said valve seat, each of said valve actuators being coupled to a trigger means adapted to effect the simultaneous rotation of said valve actuators.

2. A foam gun head comprising, in combination: a gun body having a central chamber; an outlet nozzle means communicating with said chamber; first and second inlet passages connecting to opposite side portions of said body; first and second inlet valve means positioned adjacent to said opposite side portions of said gun body for passing foam ingredients from said inlet passages into said central chamber when moved from closed positions to open positions; a pistol grip secured to said body; and trigger means coupled to said body for enabling simultaneous operation of said first and second inlet valves, each of said inlet valves including: a rotatable valve actuator connected to said trigger means for rotation through a small arc, the interior of said actuator having a plurality of cam follower surfaces; a valve body having a central bore passing therethrough and a plurality of cam surfaces for engaging said cam follower surfaces, said gun body having a side bore receiving said valve body and including a reduced diameter portion defining a valve seat communicating with said central chamber, said inlet passage communicating with said side bore between said valve body and said valve seat; means for constraining said valve body against rotational and longitudinal movement in said side bore; a valve stem passing through said central bore of said valve body and longitudinally movable therein, one end of said valve stem secured to said actuator and the other end of said valve stem terminating in a valve head structure adapted to seat on said valve seat; and a biasing spring in said side bore urging said valve head structure against said valve seat, rotation of said actuator in a given direction by said trigger means causing said cam follower surfaces to move relative to said cam surfaces to cam said actuator in a longitudinal direction away from said side bore to thereby move said valve stem and head structure longitudinally away from said valve seat and provide communication between said inlet passage and said central chamber.

3. A foam gun head according to claim 2, in which said means for constraining said valve body against rotational and longitudinal movement in said side bore includes circumferentially spaced outwardly directed projections on the exterior surface of said valve body and circumferentially spaced inwardly directed projections on the interior surface of said side bore so that said valve body may be inserted in said side bore by passing its projections between the projections in said side bore and rotating said valve body until said projections are longitudinally aligned, said projections on said valve body having recessed areas to receive the opposed projections in side bore when in longitudinl alignment; and spring means in said side bore urging said opposed projections together to key said valve body within said side bore whereby assembly and disassembly of said valve means is simplified.

4. A foam gun head according to claim 2, in which said valve head structure includes an annular channel of partially circular cross-section formed in said other end of said stem; an O-ring received in said channel; and a valve head surrounding said other end of said stem and including an inner beveled portion opposing said annular channel to cradle said O-ring over more than half its cross-sectional circumference, to hold said O-ring in a position to engage said valve seat, there being provided a slight clearance to the rear of said beveled portion for receiving expanded portions of said O-ring when urged into engagement with said valve seat.

5. A foam gun head according to claim 2, in which said valve head structure includes an annular flange on said other end of said stem; a valve head surrounding said stem and securing thereto in spaced relationship to the rear of said flange to define an annular channel therebetween; and a ring of resilient material keyed in said channel and defining a beveled engaging surface for seating on said valve seat.

References Cited

UNITED STATES PATENTS

| | | | |
|---|---|---|---|
| 2,477,127 | 7/1949 | Holtz | 251—253 |
| 2,624,542 | 1/1953 | Ghormley. | |
| 2,673,570 | 3/1954 | Cunningham | 251—357 |
| 3,232,538 | 2/1966 | Hammon | 239—413 |
| 2,814,471 | 11/1957 | Carr. | |

WILLIAM F. O'DEA, *Primary Examiner.*

HOWARD M. COHN, *Assistant Examiner.*